United States Patent
Xu

(10) Patent No.: US 11,231,724 B2
(45) Date of Patent: Jan. 25, 2022

(54) DYNAMIC MANAGEMENT OF INSERTIONS OF VEHICLES

(71) Applicant: PSA AUTOMOBILES SA, Shanghai (CN)

(72) Inventor: Yang Xu, Shanghai (CN)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 17/287,019

(22) PCT Filed: Nov. 29, 2018

(86) PCT No.: PCT/CN2018/118098
§ 371 (c)(1),
(2) Date: Apr. 20, 2021

(87) PCT Pub. No.: WO2020/107309
PCT Pub. Date: Jun. 4, 2020

(65) Prior Publication Data
US 2021/0311496 A1     Oct. 7, 2021

(51) Int. Cl.
*G05D 1/02* (2020.01)

(52) U.S. Cl.
CPC ......... *G05D 1/0289* (2013.01); *G05D 1/0214* (2013.01); *G05D 1/0276* (2013.01); *G05D 1/0295* (2013.01); *G05D 2201/0213* (2013.01)

(58) Field of Classification Search
CPC .. G05D 1/0289; G05D 1/0276; G05D 1/0295; G05D 1/0214; G05D 2201/0213
See application file for complete search history.

(56) References Cited

U.S. PATENT DOCUMENTS

| | | | |
|---|---|---|---|
| 9,802,614 B1 | 10/2017 | Yoon | |
| 2016/0091897 A1* | 3/2016 | Nilsson | B60W 30/16 |
| | | | 701/25 |
| 2018/0319403 A1* | 11/2018 | Buburuzan | G08G 1/167 |

FOREIGN PATENT DOCUMENTS

| | | |
|---|---|---|
| CN | 104252796 A | 12/2014 |
| CN | 106530833 A | 3/2017 |

(Continued)

OTHER PUBLICATIONS

International Search Report for PCT/CN2018/118098 dated Sep. 2, 2019.
Written Opinion for PCT/CN2018/118098 dated Sep. 2, 2019.

*Primary Examiner* — Rodney A Butler
(74) *Attorney, Agent, or Firm* — Sandberg Phoenix & von Gontard, P.C.

(57) ABSTRACT

A method of managing priorities between at least a waiting vehicle and an inserting vehicle, at least the waiting vehicle being configured to be associated with at least two priority states, a yield priority state and a lock priority state, indicating whether or not the vehicle is available to yield the passage, the method comprises the following steps, implemented by at least a device linked to the first vehicle: —reception of a priority state information by the waiting vehicle; —upon reception of an insertion request received from the inserting vehicle, if the priority state information corresponds to the yield priority state, generation of a yield instruction for the waiting vehicle and generation of a yield confirmation message for the inserting vehicle; —sending of the yield confirmation message to the inserting vehicle. This method improves the security of the lane where the emergency vehicles need to be inserted.

10 Claims, 3 Drawing Sheets

(56) References Cited

FOREIGN PATENT DOCUMENTS

| | | | |
|---|---|---|---|
| CN | 107406078 | A | 11/2017 |
| CN | 107438545 | A | 12/2017 |
| CN | 207909355 | U | 9/2018 |
| CN | 108657066 | A | 10/2018 |
| CN | 108765982 | A | 11/2018 |
| JP | 6273754 | B2 | 2/2018 |

* cited by examiner

DYNAMIC MANAGEMENT OF INSERTIONS OF VEHICLES

CROSS-REFERENCE TO RELATED APPLICATIONS

This application is the US National Stage under 35 USC § 371 of International Application No. PCT/CN2018/118098, filed 28 Nov. 2018 which is incorporated herein by reference.

FIELD OF THE INVENTION

The present invention relates to the field of connected cars.

It finds applications, in particular while not exclusively, in a dedicated application designed for a dynamic management of vehicle insertions.

BACKGROUND OF THE INVENTION

The term "insertion" refers to any kind of situation in which a first vehicle, hereafter referred as "inserting vehicle", changes its path to integrate a new path in which at least one second vehicle, hereafter referred as "waiting vehicle", is present. By "path", it is here referred as any kind of trajectory, lane, way, etc. followed by a vehicle.

For example, before exit ways of two-lane highways of right-hand traffic countries, the inserting vehicle can be located in the left lane and the waiting vehicle in the rightmost lane in prevision of the exit lane. In this case, the waiting vehicle can be slowed by a congestion on the exit lane and the inserting vehicle wants to insert the rightmost lane to be able to take the exit way.

In this case, the waiting vehicle is rarely keen on yielding the passage to the inserting vehicle. This can lead to a dangerous situation because other faster vehicles which do not want to take the exit lane can crash in the inserting vehicle, which tries, slowly, to insert into the rightmost lane. This situation is also under-optimized as vehicles slow down for the insertion. This could lead to an additional congestion.

To avoid those situations, it has been proposed to use the functionalities provided by the connectivity of the vehicles. In particular, for emergency or premium vehicles, messages can be exchanged with vehicles located in the lane where the emergency/premium vehicles needs to be inserted in order to yield the passage more efficiently to the emergency/premium vehicle.

However, with those solutions, the waiting vehicle is passive and its only possibility is to yield the passage of the inserting vehicle, even if the passengers of the waiting vehicle are in a hurry.

SUMMARY OF THE INVENTION

To address these needs, a first aspect relates to a method of managing priorities between at least a waiting vehicle and an inserting vehicle, at least the waiting vehicle being configured to be associated with at least two priority states, a yield priority state and a lock priority state, indicating whether or not the vehicle is available to yield to the passage of the inserting vehicle, the method comprising the following steps, implemented by at least a device linked to the first vehicle:

reception of a priority state information by the waiting vehicle;

upon reception of an insertion request received from the inserting vehicle, if the priority state information corresponds to the yield priority state, generation of a yield instruction for the waiting vehicle and generation of a yield confirmation message for the inserting vehicle;

sending of the yield confirmation message to the inserting vehicle.

Thus, a dynamic management of the inserting vehicle is made possible. Indeed, a dynamic management of vehicles intended for yielding the passage (here the waiting vehicle) is provided as the priority state information is received before the waiting vehicle is instructed to yield the passage.

Therefore, a personal system (when the driver provides the priority state information) or centralized system (when a server provides the priority state information) is dynamically (the priority state information can be received in real-time) made possible.

In an embodiment, the yield instruction is configured to instruct at least a propulsion or/and a direction means of the waiting vehicle to yield to the passage to the inserting vehicle. In another embodiment, the yield instruction is configured to generate a message to a driver of the waiting vehicle to inform said driver of an insertion of the inserting vehicle. Thus, depending on the application, the driver can perform the yield maneuver or let the autonomous vehicle perform it.

In an embodiment, the generation step comprises the sub-steps of:

reception of the insertion request received from the inserting vehicle;

if the priority state information corresponds to the yield priority state, generation of a yield validation message to a driver of the waiting vehicle, said yield validation message requesting the driver to validate or refuse to yield the passage to the inserting vehicle;

upon reception of a positive answer to the yield validation message, generation of the yield instruction for the waiting vehicle and of the yield confirmation message for the inserting vehicle.

Thus, the driver always has the possibility to refuse yielding the passage.

In an embodiment, the insertion request comprises a token. In another embodiment, the method further comprises, after the step of sending of the yield confirmation message to the inserting vehicle, a step of receiving a token from the inserting vehicle.

Such an exchange of tokens makes it possible for drivers to manage their time. For instance, a driver in a hurry can decide to spend tokens whereas a driver having extra time can decide to yield passage and earn tokens for the next time he will be in a hurry.

In an embodiment, the priority state information is received from a human-computer interface. Thus, the priority state can be chosen according to the time available for the driver, the passenger or any third party having control over the waiting vehicle.

In an embodiment, the priority state information is received from a priority management server. Therefore, a centralized management of insertion can be implemented.

The term "priority management server" refers to any kind of device able to exchange data with the device linked with the waiting vehicle. A server managed by a highway authority, a smartphone of a pedestrian, a system comprising several devices of a telecom operator are examples of priority management servers.

A second aspect concerns a computer program product recorded on a storage medium and executable by a computer in the form of a software agent including at least one software module setup to implement the method according to any one of the above-noted embodiments.

A third aspect refers to a device for managing priorities between at least a waiting vehicle and an inserting vehicle, at least the waiting vehicle being configured to be associated with at least two priority states, a yield priority state and a lock priority state, indicating whether or not the vehicle is available to yield the passage, the device being linked with the waiting vehicle and comprising at least a processor and at least a memory configured to perform the steps of:

reception of a priority state information by the waiting vehicle;

upon reception of an insertion request received from the inserting vehicle, if the priority state information corresponds to the yield priority state, generation of a yield instruction for the waiting vehicle and generation of a yield confirmation message for the inserting vehicle;

sending of the yield confirmation message to the inserting vehicle.

A fourth aspect refers to a vehicle comprising the above-noted device.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF EMBODIMENTS

The invention is described below in a non-limiting application for the case of an autonomous vehicle traveling on a highway with two roadways separated by a median and each roadway having two lanes. Other applications such as a bus on a dedicated lane or a motorcycle on a country road are also possible.

Figure 1:
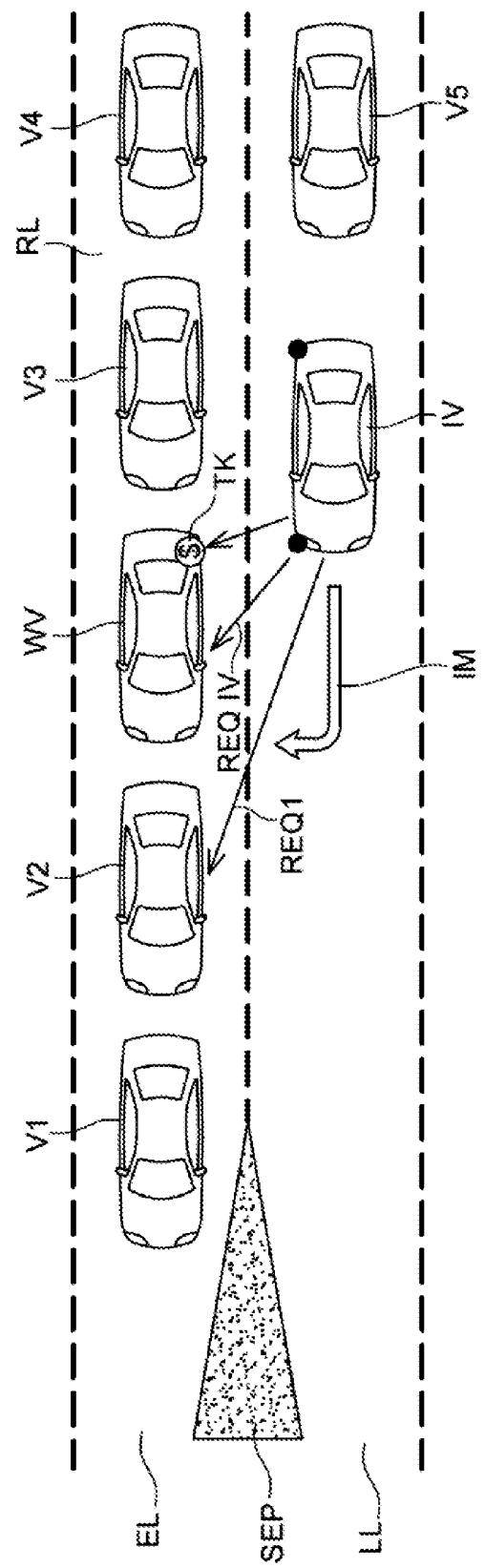
FIG. 1 represents a context of application of the method, according to some embodiments of the method.

FIG. 1 illustrates the two lanes, right lane RL and left lane LL, of the roadway of the highway.

In the right lane, vehicles V1, V2, V3, V4 and a waiting vehicle WV are congested and drive slowly to take an exit lane EL located after an exit separator SEP. an inserting vehicle IV and a vehicle V5 drive on the left lane LL.

In this situation, although the inserting vehicle IV drives on the left lane LL, it is admitted that the inserting vehicle IV intends to exit the highway by taking the exit lane EL. To do so, the inserting vehicle IV tries to insert the right lane RL. This could be difficult as this right lane RL is congested. Moreover, vehicles waiting in the right lane RL are not necessarily keen on yielding passage to a vehicle located on the left lane LL.

The inserting maneuver that needs to be performed by the inserting vehicle IV is the maneuver IM. As it will be seen hereafter in reference of FIG. 2, a token TK is sent from the inserting vehicle IV to the waiting vehicle WV in an embodiment of the method. To do so, several requests REQ1 and REQ IV are sent by the inserting vehicle to vehicles located in the right lane RL.

Figure 2:
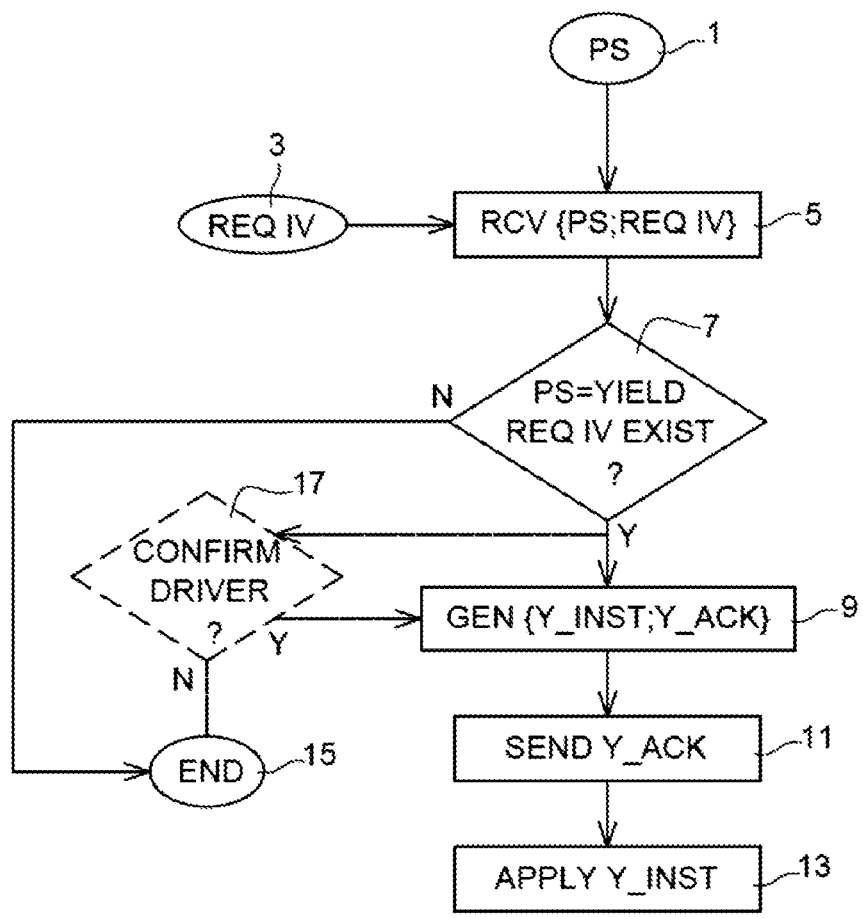
FIG. 2 represents a flowchart of the steps of a method according to some embodiments of the method.

FIG. 2 shows a flowchart of the steps implemented by the method according to an embodiment of the method.

At a step 1, a priority state PS information is provided. Two priority states can be associated with a vehicle, a yield priority state and a lock priority state.

In an embodiment, the priority state information is received from a human-computer interface. For example, the driver of the waiting vehicle can select the priority state of his vehicle with a graphical user interface of an infotainment system of the vehicle. On another example, a passenger of the vehicle (e.g. a client of taxi) can select the priority state of the vehicle on a personal device (e.g. on its smartphone).

On another embodiment, the priority state information is received from a priority management server. For example, the priority management server is a server managed by a highway authority. The priority management server is able to provide a centralized management of insertions (e.g. such as the exit lane described here).

As it will be described hereafter in reference with FIG. 3, a combination of known components (antenna, digital signal processor, etc.) can be used to receive such a priority state information.

At a step 3, the inserting vehicle IV sends an insertion request REQ IV.

The priority state PS information and the insertion request REQ IV are received at a step 5. As it will be described hereafter in reference with FIG. 3, those data exchanges can be processed through a variety of networks and connections (5G, ITS, Bluetooth, etc.).

In an embodiment, the insertion request comprises a token TK. In an embodiment, the token TK is received from the inserting vehicle IV after the sending of the yield confirmation message Y_ACK (see step 9 hereafter) to the inserting vehicle.

At a step 7, it is verified that the priority state PS information received at step 5 corresponds to the yield priority state and that the request REQ IV has been received. In an embodiment, it is verified that the priority state received at step 5 corresponds to the yield priority state each time a request is received from another vehicle.

If the verification is negative (e.g. the priority state corresponds to the lock priority state), the method ends at a step 15.

If the verification is positive, a yield instruction Y_INST for the waiting vehicle and generation of a yield confirmation message Y_ACK for the inserting vehicle are generated at a step 9.

In an embodiment, the method further comprises the steps of:

if the priority state information corresponds to the yield priority state, generation of a yield validation message to a driver of the waiting vehicle, said yield validation message requesting the driver to validate or refuse to yield the passage to the inserting vehicle;

upon reception of a positive answer to the yield validation message at a step 17, generation of the yield instruction for the waiting vehicle and of the yield confirmation message for the inserting vehicle. If the driver refuses, the process ends at step 15.

In an embodiment, the yield instruction Y_INST is configured to instruct at least a propulsion or/and a direction means of the waiting vehicle to yield the passage to the inserting vehicle. For example, for an autonomous waiting vehicle WV, the instruction Y_INST is used by a unit in charge of the autonomous driving such that the autonomous vehicle yields the passage to the inserting vehicle.

In an embodiment, the yield instruction is configured to generate a message to a driver of the waiting vehicle to inform said driver of an insertion of the inserting vehicle. In this case, the driver of the waiting vehicle WV can keep the responsibility of maneuvering its vehicle to yield the passage to the inserting vehicle IV.

At a step 11, the waiting vehicle WV sends the yield confirmation message Y_ACK to the inserting vehicle IV. In an embodiment, the inserting vehicle proceeds with the insertion maneuver IM, in an autonomous way or not (information of the driver), upon reception of the yield confirmation message Y_ACK.

At a step 13, the instruction Y_INST is applied (display to driver or autonomous yield, see step 9 above).

Figure 3:
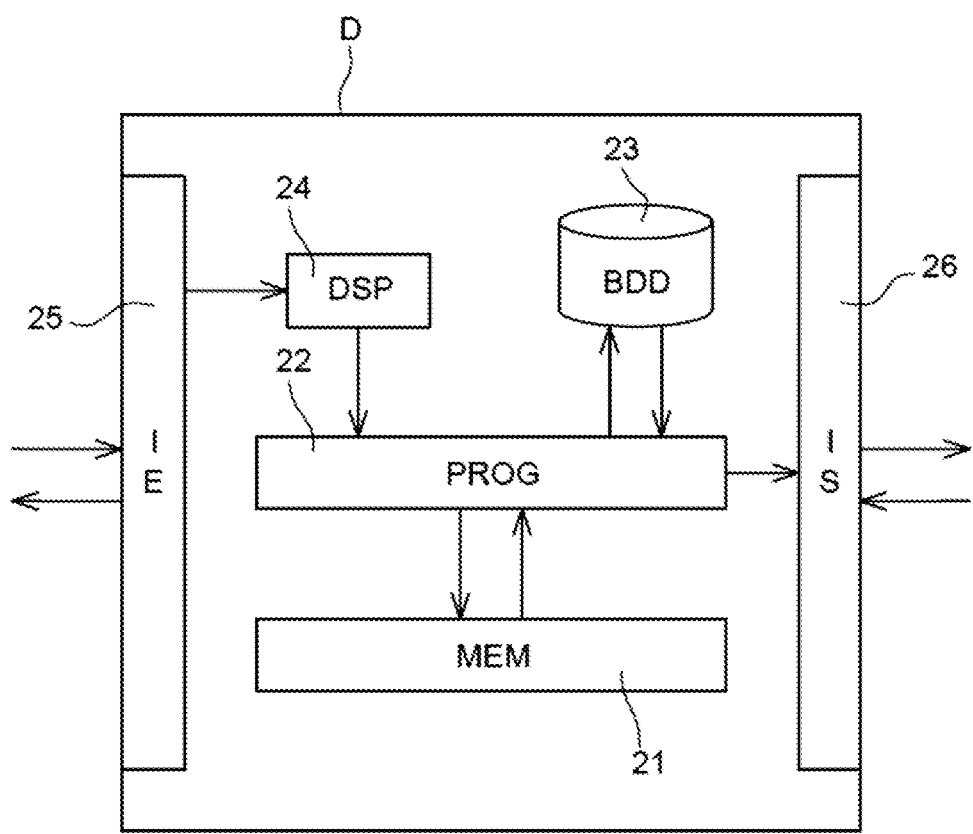
FIG. 3 represents a device which can carry out the method.

FIG. 3 is a possible embodiment for a device comprised or merely linked (wire or unwired connection) with the waiting vehicle WV.

In this embodiment, the device D comprises a hard memory 23 to store program instructions loadable into a volatile memory 21 and adapted to cause circuit 22 to carry out the steps of the present method when the program instructions are run by the circuit 22.

The memory 21 may also store data and useful information for carrying the steps of the method as described above.

The circuit 22 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising these instructions, or
- an electronic card wherein the steps of the invention are described within silicon.

This device D comprises an input interface 25 for the reception of data used for the above method according to the invention and an output interface 26 for providing a stacked model.

The device D also comprises, or is linked in a wired or unwired way, to known components configured to exchange data with remote entities (e.g. with the priority management server, with other vehicles such as the inserting vehicles, etc.). Such known components are for example an antenna, a digital signal processor, a circuit configured to decode/decompress/compress/code data, a wire, etc. Data (e.g. yield confirmation message, Y_ACK, insertion request REQ IV, etc.) are exchanged using know networks such as cellular networks (4G, 5G, etc.), ad-hoc networks dedicated to the automotive (ITS, PC5, etc.), short range (Bluetooth, Wi-Fi, etc.), etc.

A person skilled in the art will readily appreciate that various parameters disclosed in the description may be modified and that various embodiments disclosed may be combined without departing from the scope of the invention.

Thus, an embodiment has been described above with vehicles on a highway with two roadways, each comprising two lanes, the roadways being separated by a median. The method can also be implemented for other types of roads, such as single-lane national roads with two lanes, divided highways, each roadway comprising six lanes, and so on.

The invention claimed is:

1. A method of managing priorities between at least a waiting vehicle and an inserting vehicle, at least the waiting vehicle being configured to be associated with at least two priority states, a yield priority state and a lock priority state, indicating whether or not the vehicle is available to yield the passage, the method comprising the following steps, implemented by at least a device linked to the waiting vehicle:
    reception by the device of a priority state information by the waiting vehicle;
    upon reception of an insertion request received from the inserting vehicle, if the priority state information corresponds to the yield priority state, generation by the device of a yield instruction (Y_INST) for the waiting vehicle and generation of a yield confirmation message (Y_ACK) for the inserting vehicle;
    transmission by the device of the yield confirmation message to the inserting vehicle;
    communicating, using the device linked to the waiting vehicle, the yield instruction to a unit for controlling autonomous driving of the waiting vehicle; and
    the unit, in response to the yield instruction, controlling a propulsion device of the waiting vehicle to cause the waiting vehicle to yield to the inserting vehicle.

2. The method according to claim 1, wherein the yield instruction is configured to instruct at least a propulsion or/and a direction means for the waiting vehicle to yield the passage to the inserting vehicle.

3. The method according to claim 1, wherein the yield instruction is configured to generate a message to a driver of the waiting vehicle to inform said driver of an insertion of the inserting vehicle.

4. The method according to claim 1, wherein the generation step comprises the sub-steps of:
    reception of the insertion request received from the inserting vehicle;
    if the priority state information corresponds to the yield priority state, generation of a yield validation message to a driver of the waiting vehicle, said yield validation message requesting the driver to validate or refuse to yield the passage to the inserting vehicle;
    upon reception of a positive answer to the yield validation message, generation of the yield instruction for the waiting vehicle and of the yield confirmation message for the inserting vehicle.

5. The method according to claim 1, wherein the insertion request comprises a token.

6. The method according to claim 1, further comprising, after the step of sending of the yield confirmation message to the inserting vehicle, a step of receiving a token from the inserting vehicle.

7. The method according to claim 1, wherein the priority state information is received from a human-computer interface.

8. The method according to claim 1, wherein the priority state information is received from a priority management server.

9. A device for managing priorities between at least a waiting vehicle and an inserting vehicle, at least the waiting vehicle being configured to be associated with at least two priority states, a yield priority state and a lock priority state, indicating whether or not the vehicle is available to yield the passage, the device being linked with the waiting vehicle and comprising at least a processor and at least a memory; said processor being configured to perform the steps of:
    reception of a priority state information by the device linked with the waiting vehicle;
    upon reception of an insertion request received from the inserting vehicle, if the priority state information corresponds to the yield priority state, generation by the device of a yield instruction for the waiting vehicle and generation of a yield confirmation message for the inserting vehicle;
    transmitting by the device of the yield confirmation message to the inserting vehicle; and communicating, using the device linked to the waiting vehicle, the yield instruction to a unit for controlling autonomous driving of the waiting vehicle including for controlling a propulsion device of the waiting vehicle, the instruction and the unit adapted and configured to, upon receipt of the instruction at the unit, cause the propulsion device of the waiting vehicle to cause the waiting vehicle to yield to the inserting vehicle.

10. A vehicle comprising:
a propulsion device;
a unit adapted and configured to control the propulsion device; and
a device for managing priorities between at least a waiting vehicle and an inserting vehicle, at least the waiting vehicle being configured to be associated with at least two priority states, a yield priority state and a lock priority state, indicating whether or not the vehicle is available to yield the passage, the device being linked with the waiting vehicle and comprising at least a processor and at least a memory; said processor being configured to perform the steps of:
reception by the device of a priority state information by the waiting vehicle;
upon reception of an insertion request received from the inserting vehicle, if the priority state information corresponds to the yield priority state, generation by the device of a yield instruction for the waiting vehicle and generation of a yield confirmation message for the inserting vehicle;
transmission by the device of the yield confirmation message to the inserting vehicle;
communicating, using the device of the vehicle with the vehicle being the waiting vehicle, the yield instruction to the unit of the waiting vehicle to cause the unit to control the propulsion device of the waiting vehicle to cause the waiting vehicle to yield to the inserting vehicle.

* * * * *